Jan. 20, 1953 H. N. IPSEN 2,626,041
FLEXIBLE CONVEYER
Filed March 9, 1950
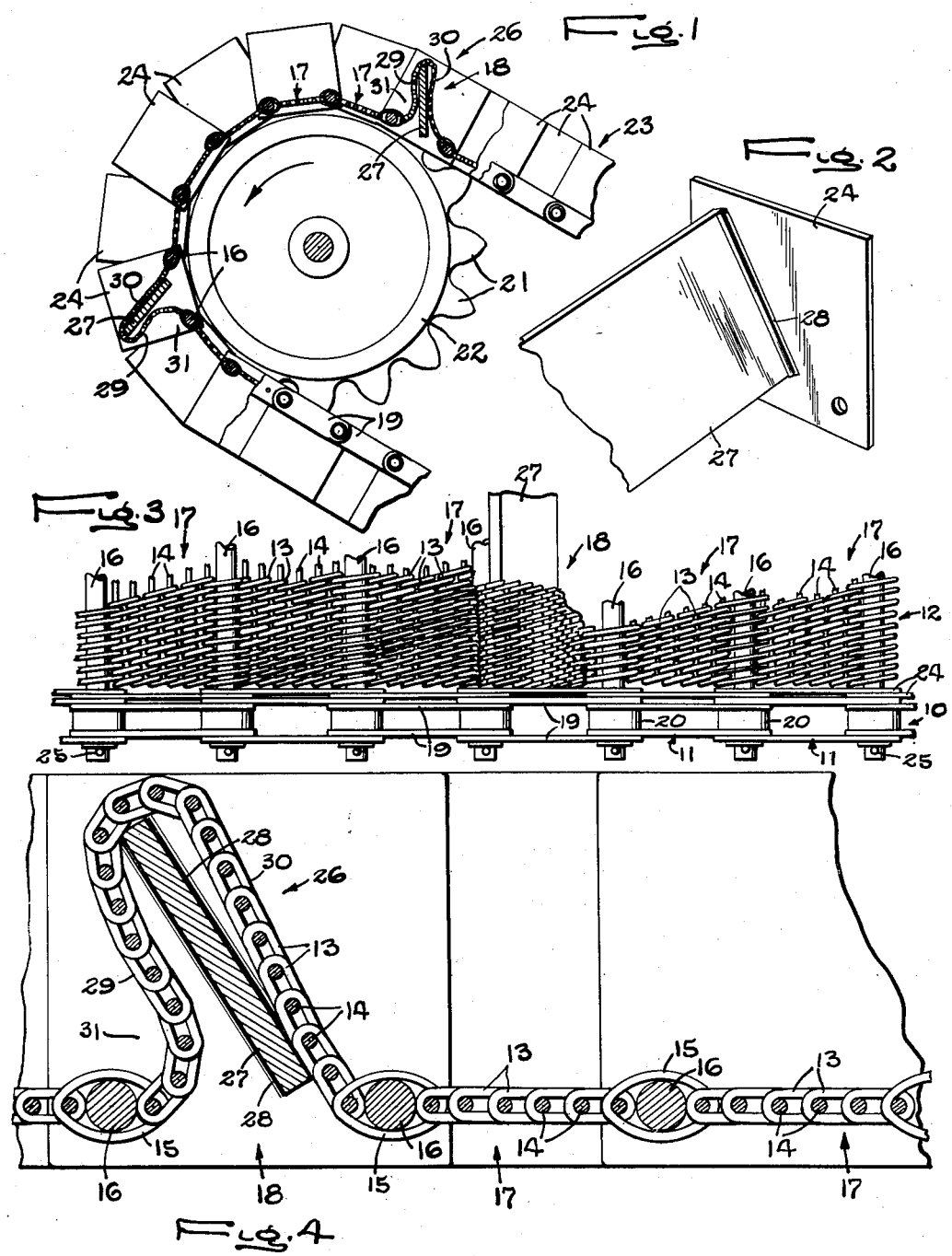
INVENTOR
Harold N. Ipsen
By Carlson, Pitzner, Hubbard Wolfe
ATTORNEYS Patented Jan. 20, 1953

2,626,041

UNITED STATES PATENT OFFICE 2,626,041

FLEXIBLE CONVEYER

Harold N. Ipsen, Rockford, Ill.

Application March 9, 1950, Serial No. 148,614

5 Claims. (Cl. 198—198)

This invention relates generally to a conveyor and, more particularly, to an endless flexible conveyor having two laterally spaced chains spanned by a flexible screen and a plurality of screen-covered work-engaging flights projecting from the screen at points spaced along the latter.

One object of the invention is to simplify the construction of a conveyor of the above character by forming each flight in a novel manner from a section of the screen itself.

Another object is to support the flights in a novel manner such that the walls thereof are free to flex to avoid sticking of workpieces on the flights.

A further object is to construct the flights in a novel manner to facilitate holding of workpieces on the conveyor when they are first picked up as well as sliding of the workpieces off from the conveyor when they are to be unloaded.

Other objects and advantages of the invention will become apparent from the following detailed description taken in connection with the accompanying drawings, in which Figure 1 is a fragmentary elevational view of a conveyor embodying the novel features of the present invention with some of the parts broken away and shown in section.

Fig. 2 is a fragmentary perspective view of the supporting member for a flight.

Fig. 3 is a fragmentary plan view of the conveyor.

Fig. 4 is an enlarged fragmentary view similar to Fig. 1.

The conveyor shown in the drawings to illustrate the present invention is especially adapted to remove workpieces from a liquid such as an oil quenching bath and includes two spaced parallel chains 10 formed of pivotally connected links 11 and spanned by an endless flexible screen 12. In this instance, the screen comprises a plurality of flattened generally helical coils 13 of wire extending across the conveyor and each having spaced turns fitting between the turns of the next adjacent coils in overlapping relation and pivotally connected thereto by crosswires 14 threading through the overlapped portions of the turns. Spaced ones of the coils 13 are enlarged in cross section as indicated at 15 (Fig. 4) to receive rigid rods 16 whose opposite ends project beyond opposite side edges of the screen and through overlapping portions of adjacent ones of the links. It will thus be seen that the screen 12 comprises a plurality of rectangular sections 17 and 18 connected adjacent their ends by the enlarged coils 15.

The chain links 11 are apertured to receive the rods and each includes two flat bars 19 overlapping at their ends with the bars of adjacent links and spaced apart laterally by rollers 20 journaled on the rods and engageable with the teeth 21 of two sets of axially spaced sprockets 22. Herein, the latter are rotatably mounted on a suitable framework (not shown) with the conveyor stretched between the two sets of sprockets. One set (not shown) is disposed lower than the other set to support the conveyor for movement of the upper straight run 23 thereof endwise and upwardly in a plane which is inclined with respect to the horizontal. To prevent workpieces from falling off of the conveyor at the side edges thereof, the links 11 preferably include generally rectangular overlapping plates 24 each of which pivotally receives two rods 16 and projects from the plane of the screen at a position between the bars 19 and the side edges of the screen. Adjacent their ends, the rods are apertured as shown at 25 (Fig. 3) to receive cotter keys by which the bars and plates are held in place on the rods.

A plurality of flights or lifts 26 extend transversely of the screen and project outwardly therefrom to pick up workpieces adjacent the lower end of the upper straight run 23 and carry the same upwardly and around the upper set of sprockets 22 from which they drop into a suitable receptacle (not shown). The work-engaging surface of each flight 26 is formed of screen to reduce the tendency of workpieces to adhere to the flight by surface tension when the conveyor moves the workpieces out of a liquid bath.

To simplify the construction of the flights 26 and facilitate unloading of workpieces from the conveyor, the invention contemplates forming each flight from a section of the screen 12 itself and supporting the same in a novel manner such that the walls of the flight are free to flex so as to break up the surface tension of the liquid and thereby reduce the tendency of workpieces to stick to the flight. For this purpose, the sections 18 of the screen are made longer than the intervening short sections 17 so that the longer sections may be folded intermediate their ends to bring their end portions into face to face relation. Each longer section 18 is generally V-shaped in cross section having its side walls pivotally connected to and merging with the adjacent screen sections 17 at opposite ends of the flight.

The support for each flight 26 comprises a member 27 which is secured rigidly to at least one of the rectangular plates 24 at the side edges of the flight so as to extend into the apex of the flight. To provide a rigid structure, each supporting member 27 is preferably formed as a flat rectangular plate which extends completely across the screen and is welded at its ends as indicated at 28 to the plates along both side edges of the flight.

To facilitate holding of workpieces on the conveyor when the upper straight run 23 thereof is disposed along a steep incline and to facilitate unloading of workpieces from the conveyor, the wall 29 of each flight on the leading side thereof makes an acute included angle with the plane of the screen while the trailing wall 30 of the flight makes an obtuse included angle with this plane. Such inclining of the walls of the flight is achieved herein by securing the supporting member 27 of the flight to the rectangular plates 24 so that the member lies in a plane which extends obliquely to the plane defined by the rods 16 at the ends of the flight. With the conveyor moving in a direction such that the supporting member 27 is inclined forwardly in the direction of travel, the leading side of each flight along the upper straight run 23 is substantially vertical and cooperates with the screen to form a pocket 31 opening along the screen in the direction of movement thereof to catch and hold workpieces which are deposited on the upper straight run.

Assuming that a flight 26 is moving upwardly along the upper straight run, workpieces falling backwardly along the portion of the conveyor ahead of the flight will be caught and held in the pocket 31 thereof. As the flight passes over the top of the upper set of sprockets 22, workpieces on the screen 12 ahead of the flight and in the pocket 31 tend to slide downwardly along and off from the conveyor. In the movement of the flight over the top, the leading side 29 of the flight flexes to break the surface tension tending to cause the workpieces to stick to the leading side. After the flight has passed the top and is moving vertically, workpieces on the screen behind the flight slide downwardly along the screen and, also, along the trailing side 30 of the flight. Since the side walls 29 and 30 of the flight are connected to and merge with the ends of the adjacent short screen sections 17, the included angles between the flight walls and these sections open up or become larger automatically as an incident to movement of the flight around the sprockets. The angle between the trailing side wall and the adjacent short screen section being obtuse along the straight run, this angle opens up to approximately 180° as the flight moves around the sprocket (Fig. 1) so as to avoid interference with the free fall of the workpieces into the receptacle.

From the foregoing, it will be apparent that each flight 26 may be formed easily from the screen 12 itself thereby reducing material and labor costs. With the screen of the flight covering the supporting member 27 loosely, workpieces tending to stick to the flights are loosened automatically as an incident to movement of the flight around the sprockets 22. Each flight, being tilted away from a perpendicular to the screen and having its side walls merging with the adjacent short screen sections 17, holds workpieces effectually on the upper straight run 23 of the conveyor while facilitating discharge of the workpieces when the flight moves around the sprockets.

I claim as my invention:

1. A conveyor having, in combination, a plurality of generally rectangular flexible screen sections arranged in end to end relation, rigid crosspieces connecting said sections together at their adjacent ends to form an endless screen, rigid links extending along opposite side edges of said screen with adjacent ends of adjacent links overlapping each other and pivotally connected to one of said crosspieces, certain ones of said sections being folded intermediate their ends to bring the opposite end portions of each section into face to face relation to form a flight extending transversely of the screen and projecting away from the plane of the latter, and a cross member projecting rigidly from the links at opposite side edges of said folded section and disposed within the latter to support the same loosely from the fold thereof and permit flexing of the walls of the section.

2. A conveyor having, in combination, two laterally spaced chains, a flexible screen extending longitudinally of and pivotally connected to said chains at points spaced along the latter, a member rigid with at least one of said chains and extending at an acute included angle with respect to said screen, a flexible sheet of screen folded intermediate its ends and straddling said member to form a flight generally U-shaped in cross section and supported loosely at its tip by the member with the sides of the flight free to flex, and means joining the ends of said sheet to said screen at points spaced along the latter.

3. A conveyor having, in combination, two laterally spaced chains, a flexible screen extending longitudinally of and pivotally connected to said chains at points spaced along the latter, a section of said screen being folded upon itself and projecting away from the chains on one side thereof to form a flight, and a member supported by at least one of said chains and disposed within the fold to support the latter, said member lying at an acute included angle with respect to said screen.

4. A conveyor having, in combination, two laterally spaced endless chains, an endless flexible screen extending longitudinally of said chains and comprising a plurality of generally rectangular sections arranged in end to end relation and pivotally connected at their adjacent ends to each other and to said chains at points spaced along the latter, spaced ones of said screen sections each being folded upon itself and projecting away from the chains on one side thereof to form a flight generally U-shaped in cross section having side walls merging with the intervening ones of said sections located adjacent opposite ends of the flight, and a member rigid with at least one of said chains and extending into each of said flights to support the same from its tip.

5. A conveyor having, in combination, two laterally spaced chains, a continuous flexible screen extending longitudinally of said chains and pivotally connected thereto at points spaced along the chains, a section of said screen being folded upon itself and projecting away from the plane of the chains on one side thereof to form a flight, and a member rigid with at least one of said chains disposed within and supporting the fold of said section.

HAROLD N. IPSEN.

REFERENCES CITED

The following references are of record in the file of this patent:

UNITED STATES PATENTS

| Number | Name | Date |
|---|---|---|
| 878,650 | Manning | Feb. 11, 1908 |
| 1,015,558 | Glisar | Jan. 23, 1912 |
| 1,634,963 | Schwartz | July 5, 1927 |
| 1,841,339 | Schroeder | Jan. 12, 1932 |
| 2,114,180 | Guba | Apr. 12, 1938 |